(12) United States Patent
Powers et al.

(10) Patent No.: US 8,851,382 B2
(45) Date of Patent: Oct. 7, 2014

(54) SYSTEM AND METHOD FOR ESTIMATION AND CLASSIFICATION OF BARCODES USING HEURISTIC AND STATISTICAL MEASURES

(75) Inventors: Jeffrey Roger Powers, Boulder, CO (US); Vikas Muppiddi Reddy, Boulder, CA (US)

(73) Assignee: eBay Inc., San Jose, CA (US)

( * ) Notice: Subject to any disclaimer, the term of this patent is extended or adjusted under 35 U.S.C. 154(b) by 765 days.

(21) Appl. No.: 12/885,221

(22) Filed: Sep. 17, 2010

(65) Prior Publication Data

US 2011/0068175 A1 Mar. 24, 2011

Related U.S. Application Data

(60) Provisional application No. 61/245,635, filed on Sep. 24, 2009.

(51) Int. Cl.
*G06K 7/10* (2006.01)
*G06K 7/14* (2006.01)

(52) U.S. Cl.
CPC .............. *G06K 7/14* (2013.01); *G06K 7/1443* (2013.01)
USPC ............... 235/462.25; 235/454; 235/462.01

(58) Field of Classification Search
USPC ................ 235/454, 462.01, 462.06–462.12, 235/462.25
See application file for complete search history.

(56) References Cited

U.S. PATENT DOCUMENTS

| | | | |
|---|---|---|---|
| 5,262,626 A * | 11/1993 | Goren et al. | 235/462.07 |
| 5,278,398 A * | 1/1994 | Pavlidis et al. | 235/462.12 |
| 2007/0211148 A1 | 9/2007 | Lev et al. | |
| 2009/0001173 A1 | 1/2009 | Sevier et al. | |
| 2009/0108071 A1 | 4/2009 | Carlson | |
| 2009/0277962 A1 | 11/2009 | Mccloskey | |
| 2010/0187311 A1 * | 7/2010 | van der Merwe et al. | 235/462.01 |
| 2010/0189367 A1 * | 7/2010 | van der Merwe et al. | 382/217 |
| 2011/0068173 A1 | 3/2011 | Powers et al. | |
| 2012/0104100 A1 * | 5/2012 | Gallo et al. | 235/462.27 |
| 2012/0331140 A1 | 12/2012 | Wang et al. | |

OTHER PUBLICATIONS

Adelmann, Robert, et al., "Toolkit for Bar Code Recognition and Resolving on Camera Phones—Jump Starting the Internet of Things", [Online]. Retrieved from the Internet: <URL: http://citeseerx.ist.psu.edu/viewdoc/summary?doi=10.1.1.69.5519>, (2006), 8 pgs.

Chai, Douglas, et al., "Locating and Decoding EAN-13 Barcodes from Images Captured by Digital Cameras", IEEE, ICICS, (2005), 5 pgs.

(Continued)

*Primary Examiner* — Thien M Le
*Assistant Examiner* — April Taylor
(74) *Attorney, Agent, or Firm* — Schwegman Lundberg & Woessner, P.A.

(57) ABSTRACT

In a system and method of estimating and classifying a barcode using heuristic and statistical measures, a classification determination is generated for each of a plurality of estimated barcode digits that correspond to a decoded barcode estimation. The classification determination is selected from one of a first classification determination and a second classification determination. The first classification determinations among a plurality of estimation determinations are aggregated. The aggregated first classification determinations are compared to a first predetermined threshold to determine a validity of the decoded barcode estimation.

19 Claims, 5 Drawing Sheets

(56) References Cited

OTHER PUBLICATIONS

Chien, Sky Chew Chee, "Mobile Phone Bar Code Reader", Thesis submitted to the School of Information Technology and Electrical Engineering at the University of Queensland, (Oct. 24, 2007), 69 pgs.

Liyanage, J P, "Efficient Decoding of Blurred, Pitched, and Scratched Barcode Images", Second International Conference on Industrial and Information Systems, [Online]. Retrieved from the Internet: <URL: http://www.cs.ucf.edu/~janaka/projects/barcode/barcode_paper.pdf>, (Aug. 2007), 6 pgs.

Ohbuchi, Eisaku, et al., "Barcode Readers using the Camera Device in Mobile Phones", IEEE, International Conference on Cyberworlds, (2004), 6 pgs.

Rohs, Michael, et al., "Using Camera-Equipped Mobile Phones for Interacting with Real-World Objects", Advances in Pervasive Computing, [Online]. Retrieved from the Internet: <URL: http://citeseer.ist.psu.edu/viewdoc/summary?doi=10.1.1.2.7195>, (2004), 7 pgs.

Tan, Keng T., "JPEG color barcode images analysis: A camera phone capture channel model with auto-focus", International Journal of Signal Processing, Image Processing and Pattern Recognition vol. 2, No. 4,, (Dec. 2009), 10 pgs.

Terebes, Romulus, et al., "Camera Phone Based Barcode Decoding System", ACTA Technica Napocensis vol. 49, No. 3, (2008), 57-62.

Wachenfeld, Steffen, et al., "Robust Recognition of 1-D barcodes Using Camera Phones", IEEE, (2008), 4 pgs.

"U.S. Appl. No. 12/885,155 , Response filed Apr. 23, 2013 to Non Final Office Action mailed Jan. 23, 2013", 13 pgs.

"U.S. Appl. No. 12/885,155, Non Final office Action mailed Jan. 23, 2013", 8 pgs.

U.S. Appl. No. 12/885,15 , Response filed Dec. 17, 2013 to Non Final Office Action mailed Sep. 17, 2013, 14 pgs.

U.S. Appl. No. 12/885,155, Non Final Office Action mailed Sep. 17, 2013, 9 pgs.

Gallo, Orazio, et al., "Reading Challenging Barcodes with Cameras", (Dec. 7, 2009), 6 pages.

\* cited by examiner

SYSTEM AND METHOD FOR ESTIMATION AND CLASSIFICATION OF BARCODES USING HEURISTIC AND STATISTICAL MEASURES

CROSS-REFERENCE TO RELATED APPLICATIONS

This application claims the benefit of the filing date of U.S. provisional application Ser. No. 61/245,635, filed Sep. 24, 2009, and entitled "SYSTEM AND METHOD FOR RECOGNIZING DEFORMED LINEAR BARCODES FROM A STREAM OF VARIED-FOCUS VIDEO FRAMES," and is related to U.S. patent application Ser. No. 12/885,155, filed herewith, and entitled "SYSTEM AND METHOD FOR RECOGNIZING DEFORMED LINEAR BARCODES FROM A STREAM OF VARIED-FOCUS VIDEO FRAMES," which applications are incorporated herein by reference in their entirety.

TECHNICAL FIELD

This application relates generally to the field of barcode processing, and more specifically, to a system and method of estimating and classifying barcodes using heuristic and statistical measures.

BACKGROUND

Barcodes are widely used to identify and track goods and documents, among other things. A commonly used barcode is a linear barcode, which is a machine-readable representation of data that represents data in the widths and spacing of parallel lines. Different linear barcode formats have emerged over time, with Universal Product Code (UPC) and European Article Number (EAN) being two commonly used barcode formats.

A commonly used UPC code is a UPC-A barcode. A UPC-A barcode is characterized by twelve decimal digits, preceded by a start delimiter and followed by an end delimiter. In the middle of the twelve digit barcode, between the sixth and seventh digits, is a middle delimiter. The start, middle, and end delimiters function to separate the twelve digits into two groups of six digits. The start and end delimiters are characterized by a "101" bit pattern, which may be visualized as two vertical black guard bars with a white space between the bars. The middle delimiter is characterized by a "01010" bit pattern, which may be visualized as a white space, a black vertical guard bar, a white space, a black vertical guard bar, and a white space. Between the start and middle delimiters are six "left" digits, and between the middle and end delimiters are six "right" digits. Each digit is represented by a seven-bit code, with a binary '1' value represented by a vertical black bar and a binary '0' value represented by a vertical white space. The seven-bit code for each digit is represented visually as two bars and two spaces, with each of the bars and spaces having varying widths depending on the digit. To distinguish between "left" digits and "right" digits, a "left" digit seven-bit code is the inverse of a "right" digit seven-bit code. The following table illustrates the seven-bit code values for each barcode digit.

| Digit | Left Pattern | Right Pattern |
| --- | --- | --- |
| 0 | 0001101 | 1110010 |
| 1 | 0011001 | 1100110 |
| 2 | 0010011 | 1101100 |
| 3 | 0111101 | 1000010 |
| 4 | 0100011 | 1011100 |
| 5 | 0110001 | 1001110 |
| 6 | 0101111 | 1010000 |
| 7 | 0111011 | 1000100 |
| 8 | 0110111 | 1001000 |
| 9 | 0001011 | 1110100 |

Among the twelve digits of the barcode, the first, or leftmost, digit is a prefix digit, while the last, or rightmost digit, is an error correcting check digit.

A commonly used EAN barcode is an EAN-13 barcode. The EAN-13 barcode is a superset of a UPC-A barcode. The EAN-13 barcode uses thirteen digits broken up into four components: a prefix, which may be two or three digits long; a company number, which may be four to six digits long, an item reference number, which may be two to six digits, and a single checksum digit. EAN-13 barcodes differ from UPC-A barcodes in that the data digits are split into three groups—a first digit, a first group of six digits, and a second group of six digits. The first group of six digits is encoded according to one of two encoding schemes, one of which has even parity and one of which has odd parity, while the second group of six digits is encoded as bitwise complements to the digits of the first group having the odd parity encoding scheme.

Barcodes are commonly read using fixed or mounted barcode scanners, such as those found as part of a point-of-sale system, or using commercial laser-based, handheld barcode readers, which are often attached to a point-of-sale system. However, with the proliferation of handheld and mobile devices, there is a growing interest in leveraging the ability of these devices to read barcodes.

BRIEF DESCRIPTION OF THE DRAWINGS

The drawings illustrate generally, by way of example, but not by way of limitation, various embodiments discussed in the present document.

DETAILED DESCRIPTION

Although embodiments of the disclosure have been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense.

In various embodiments, a system and method to estimate and classify barcodes is disclosed. In an example embodiment, the system may comprise a processor-implemented barcode classifier module configured to generate an estimation determination for each of a plurality of estimated barcode digits. Collectively, the estimated barcode digits may represent a decoded barcode estimation. The classification determination may be either a first classification determination or a second classification determination. Further, the processor-implemented barcode classifier module may aggregate the first classification determinations among a plurality of classification determinations corresponding to the plurality of estimated barcode digits. In an example embodiment, the second classification determinations among the plurality of estimation determinations may be aggregated. A processor-implemented barcode comparator module may compare the aggregated first classification determinations with a predetermined threshold to determine a validity of the decoded barcode estimation.

Figure 1:
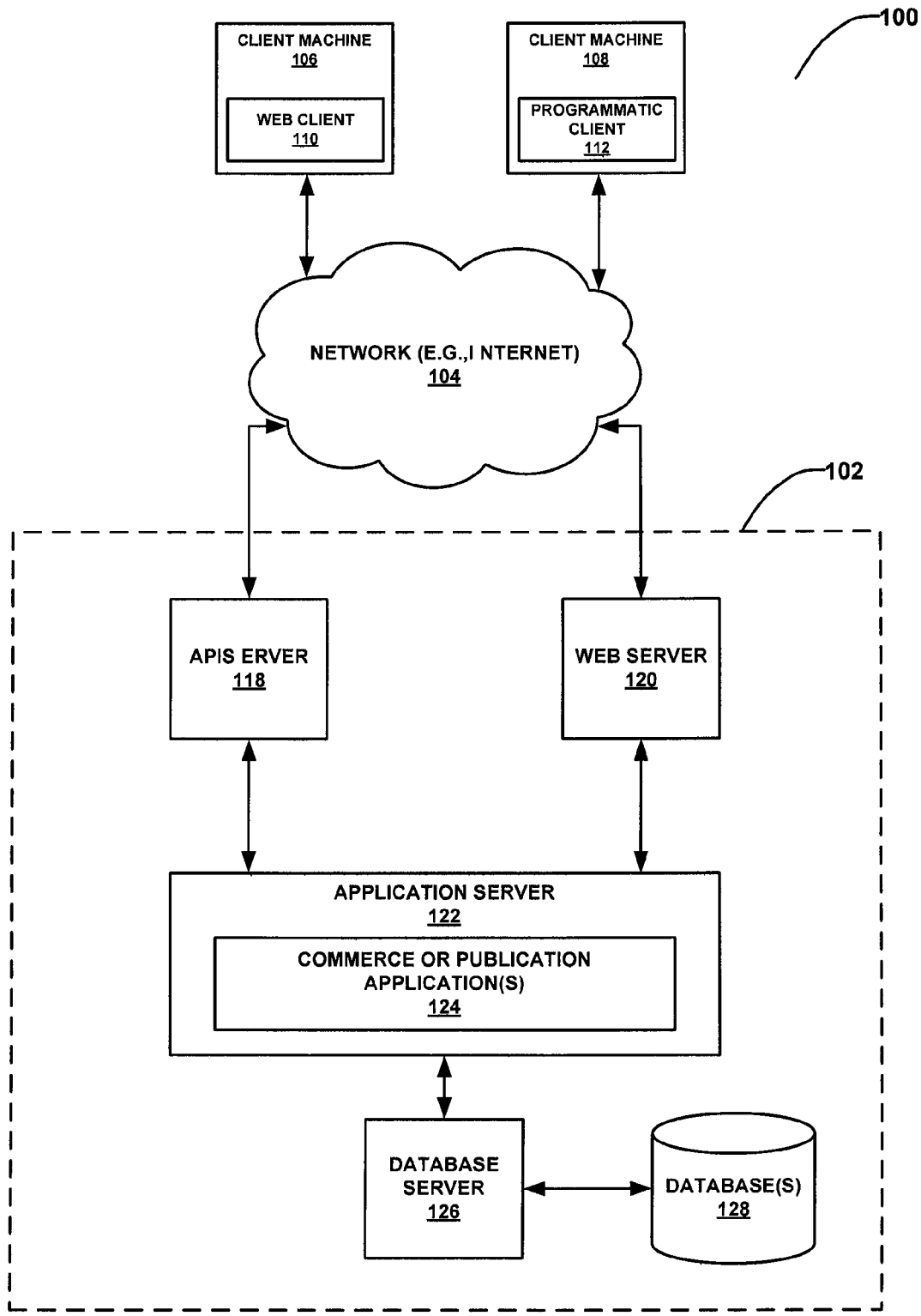
FIG. 1 is a diagram depicting a network system, according to one embodiment, having a client-server architecture configured for exchanging data over a network.

FIG. 1 is a network diagram depicting a network system 100, according to one embodiment, having a client-server architecture configured for exchanging data over a network. For example, the network system 100 may be a network-based commerce or publication/publisher 102 where clients may communicate and exchange data within the network system 100. The data may pertain to various functions (e.g., product lookups, product or price comparisons, online item purchases) associated with the network system 100 and its users. Although illustrated herein as a client-server architecture, other embodiments may include other network architectures, such as a peer-to-peer or distributed network environment.

A data exchange platform, in an example form of a network-based publisher 102, may provide server-side functionality, via a network 104 (e.g., the Internet) to one or more clients. The one or more clients may include users that utilize the network system 100 and more specifically, the network-based publisher 102, to exchange data over the network 104. These transactions may include transmitting, receiving (communicating) and processing data to, from, and regarding content and users of the network system 100. The data may include, but are not limited to, content and user data such as barcode-related data, product profiles, product reviews; product comparisons, price comparisons, product recommendations and identifiers; product and service listings associated with buyers and sellers; auction bids; and transaction data, among other things.

In various embodiments, the data exchanges within the network system 100 may be dependent upon user-selected functions available through one or more client or user interfaces (UIs). The UIs may be associated with a client machine, such as a client machine 106 using a web client 110. The web client 110 may be in communication with the network-based publisher 102 via a web server 120. The UIs may also be associated with a client machine 108 using a programmatic client 112, such as a client application. It can be appreciated in various example embodiments the client machines 106, 108 may be associated with a buyer, a seller, a payment service provider, or a shipping service provider, each in communication with the network-based publisher 102 and, optionally, each other. The buyers and sellers may be any one of individuals, merchants, or service providers, among other things. The role of a user of client machines 106, 108 is immaterial to the discussion herein and the foregoing examples are merely examples of the types of users who may operate client machines 106, 108.

Client machines 106, 108 executing web client 110 or programmatic client 112 may use the web client 110 or programmatic client 112 to read and classify a barcode. In an example embodiment, client machines 106, 108 may be handheld or mobile devices. Client machines 106, 108 may have camera functionality, implemented in example embodiments as a built-in camera or external camera. In an example embodiment, the built-in camera or external camera may have a fixed focus lens. In an example embodiment, client machines 106, 108 may capture and decode a barcode using web client 110 or programmatic client 112 (e.g., client app). Client machines 106, 108 may transmit decoded or estimated barcode information to the network-based publisher 102 to retrieve additional information concerning the decoded barcode. In an example embodiment, client machines 106, 108 may transmit a portion of an estimated barcode to the network-based publisher 102 to verify that the estimate barcode exists. In an example embodiment, if the barcode does not exist, the network-based publisher 102 may return one or more related or similar barcodes that may be applicable to the estimated barcode.

Referring to the network-based publisher 102, an application program interface (API) server 118 and a web server 120 are coupled to, and provide programmatic and web interfaces respectively to, one or more application servers 122. The application servers 122 host one or more publication or commerce application(s) 124. The application servers 122 are, in turn, shown to be coupled to one or more database server(s) 126 that facilitate access to one or more database(s) 128.

In an example embodiment, the web server 120 and the API server 118 communicate and receive data, such as in the form of decoded barcode data, pertaining to products, listings, and transactions, among other things, via various user input tools. For example, the web server 120 may send and receive data to and from a barcode reading webpage on a browser application (e.g., web client 110) operating on a client machine (e.g., client machine 106). The API server 118 may send and receive data to and from a barcode reading app (e.g., programmatic client 112) running on another client machine (e.g., client machine 108).

The commerce or publication application(s) 124 may provide a number of commerce and publisher functions and services (e.g., listing, product lookup, price comparison, payment, etc.) to users that access the network-based publisher 102. For example, the commerce and publication application(s) 124 may provide a number of services and functions to users for listing goods for sale, facilitating transactions, and reviewing or comparing products and prices of products. Data pertaining to the services and functions provided by the commerce and publication application(s) 124 may be retrieved from database(s) 128 via database server 126.

Figure 2:
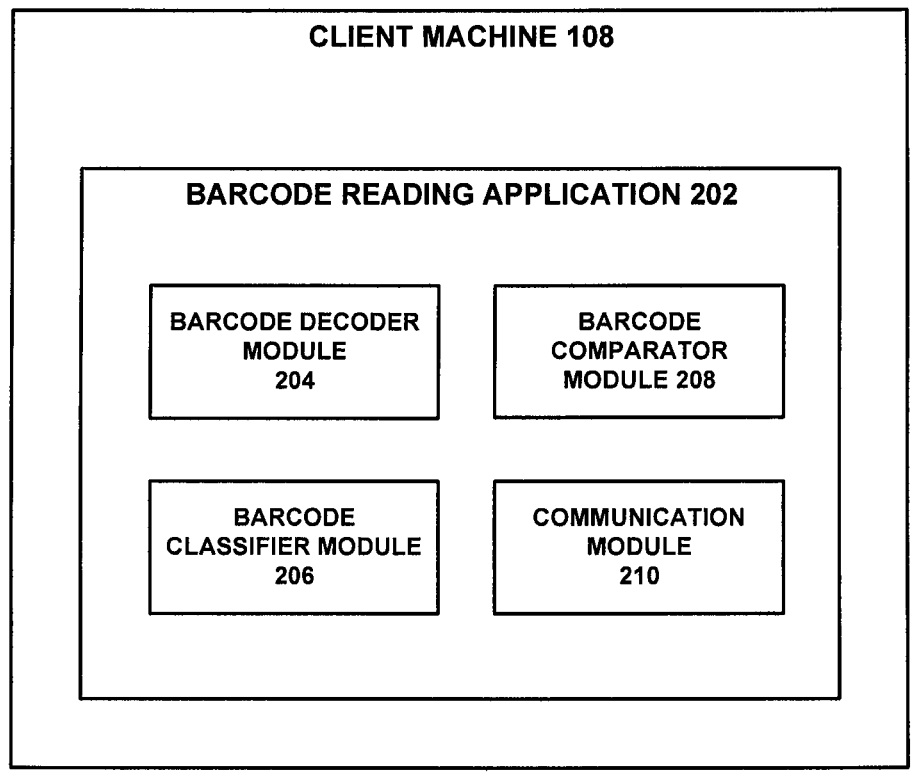
FIG. 2 is a block diagram illustrating an example embodiment of various client modules that may used to execute the processes described herein.

FIG. 2 is a block diagram illustrating an example embodiment of various client modules that may used to execute the processes described herein. For example purposes only, FIG. 2 will be described with reference to client machine 108 of FIG. 1, although one of ordinary skill in the art will recognize that any client device may be used to implement the client modules discussed herein. Client device 108 may include various modules that perform various functions. The modules may be implemented as software, hardware, firmware, or any combination thereof. Multiple functions may be performed in one or more modules as desired, and the embodiments described are merely examples. The software may be executed, at least in part, on one or more of at least one computer processor, digital signal processor, Application Specific Integrated Circuit (ASIC), microprocessor, or other type of processor operating on a system, such as a personal computer (PC), set-top box (STB), personal digital assistant (PDA), smart phone, server, router, or other device capable of processing data, including network interconnection devices.

Client machine 108 may execute a barcode reading application 202. Barcode reading application 202 may include or call at least a barcode decoder module 204, a barcode classifier module 206, a barcode comparator module 208, and a communication module 210, each of which may reside within client machine 108.

Barcode decoder module 204 may decode a barcode from a stream of video frames. When decoding a barcode, barcode decoder module 204 may account for defocus blur and barcode deformities, such as a skewed, rotated, or curved barcode. Barcode decoder module 204 may further account for the lighting conditions of the video frames. Barcode decoder module 204 also may localize the barcode within a region of the video frames to reduce the amount of the video frame to be processed. Barcode decoder module 204 also may not decode every video frame; rather, barcode decoder module 204 may determine when an amount of defocus blur contained in the video frame is of a sufficient level to warrant decoding. Further details concerning the barcode decoder module, or any of its sub-components, may be found in U.S. application Ser. No. 12/885,155, filed herewith, and entitled "SYSTEM AND METHOD FOR RECOGNIZING DEFORMED LINEAR BARCODES FROM A STREAM OF VARIED-FOCUS VIDEO FRAMES," which is incorporated herein by reference in its entirety.

Barcode classifier module 206 may receive an estimated barcode from barcode decoder module 204 and classify each estimated barcode digit as either a "likely good" or "likely bad" estimate. An estimated barcode may conform to an existing barcode. Barcode classifier module 206 may use a machine-learning algorithm to determine whether an estimated barcode digit is a "likely good" or "likely bad" estimate. For each estimated barcode digit, barcode classifier module 206 may calculate a digit error for the estimated digit and compare the digit error of the estimated digit to the digit error of a second-best estimated digit candidate. The digit error may be the summed pixel intensity difference between the actual input image (nearby the digit in question) and a synthetic representation of the best digit guess. A similar digit error calculated may be performed for the second-best digit guess. From the digit errors calculated for the best guess digit and the second-best guess digit, a ratio of the best guess digit error to the second-best guess digit error (i.e., ratio=(best guess digit error)/(second-best guess digit error)) may be calculated. This ratio may reflect a noise-to-signal ratio. The calculated ratio is compared to a threshold value to determine whether the digit guess is "likely good" or "likely bad." A lower ratio makes it more likely the digit guess is "likely good." For example, if the best guess of the estimated digit is a '4,' barcode classifier module 206 may compare the digit error of the '4' to that of a second-best guess, which, in an example embodiment, may be a '5.' If the ratio of the best guess digit error to the second-best guess digit error is lower than a predetermined threshold value, the barcode classifier module 206 may deduce that the estimated digit is a "likely good" estimate.

Barcode classifier module 206 may determine a best guess and a second-best guess for each digit position of the barcode using the known encoding of digits for a particular barcode type. For example, barcode decoder module 204 may formulate the best and second-best guesses for each barcode digit position based on the appearance of the barcode image contained in the stream of video frames. Using the example described above, if barcode decoder module 204 estimates a digit for a particular digit position of a UPC-A barcode to be a '4,' barcode classifier module 206 would expect the digit to be encoded as "0100011," which is the bit pattern that represents the digit '4' in the UPC-A barcode encoding scheme. The bit pattern corresponding to the digit '4' is represented visually as a sequence comprising a white space, a vertical bar, a wider space, and a wider vertical bar, with each '0' representing a white space, and each '1' representing a vertical bar. Using this information and the summed pixel intensity of the barcode elements corresponding to the estimated digit in the barcode image, barcode classifier module 206 may compare the summed pixel intensity of the estimated digit '4' with the summed pixel intensity of a synthetic representation for the digit '4' and determine a digit error for the estimated digit. Barcode classifier module 206 may then compare the digit error of the estimated digit with the digit error of a second-best guess for the barcode digit position to determine whether the estimated digit is a "likely good" guess.

In an example embodiment, instead of or in addition to comparing the noise-to-signal ratio of a best guess barcode digit to a second-best digit estimate, barcode classifier module 206 may compare the noise-to-signal ratio of the best guess barcode digit to a noisy answer threshold. If the noise-to-signal ratio of the best guess barcode digit is less than the noisy answer threshold, the barcode classifier module 206 may infer that the estimated barcode digit is a "likely good" estimate (i.e., the estimated barcode digit is not merely noise). Based on the results of the comparisons, barcode classifier module 206 may tally up the number of "likely good" guesses and "likely bad" guesses for the barcode.

Barcode comparator module 208 may receive the tally of guesses from barcode classifier module 206 and compare the number of "likely good" guesses to a machine-learning-derived "number of likely good digits necessary for a likely correct final result" threshold (hereinafter referred to as a "number of likely good digits threshold") to make a determination of whether the estimated barcode, as a whole, is a likely correct final result. In an example embodiment, barcode comparator module 208 makes a binary determination of whether the estimated barcode, as a whole, is a correct or incorrect estimate. The number of likely good digits threshold may dictate how many digits should be considered "likely good guesses" in order for the estimated barcode as a whole to be considered a "likely correct final result." In a simplified example embodiment, the number of likely good digits threshold may dictate that a barcode is considered a "likely correct final result" if ten out of twelve UPC-A estimated barcode digits are determined to be correct estimates.

In an example embodiment, the number of likely good digits threshold is calculated by estimating barcode values for a large batch of barcodes. The accuracy of the estimated barcode values may be verified to determine how many estimated digits were verified as "likely good" guesses versus "likely bad" guesses. Based on this verification process, a number of likely good digits threshold may be set that maximizes "likely good" guesses while minimizing false positives. The number of likely good digits threshold may be adjusted as additional barcodes are decoded and their results are fed into the test batch of barcodes for use in fine tuning the threshold value.

The adjustment of the number of likely good digits threshold may depend in part on a desired policy or objective set for the barcode reading application 202. One policy may be that it is desired that every barcode or every barcode digit decoded by the barcode reading application 202 is correct and accurate, such that no barcodes or barcode digits are determined to be false positives. A consequence of implementing this 100% accuracy policy may be that while every decoded barcode or every decoded barcode digit that is verified by the barcode comparator module 208 will be decoded correctly, in reality, only a small number of barcodes will be verified by the barcode comparator module 208 as completely accurate. As a result, the barcode reading application may not be able to read and decode many barcodes as many estimated barcodes may fail to be decoded or verified with 100% accuracy. The failure may stem from one or more digits being incorrectly estimated, due to blurriness, a barcode deformity, poor lighting, and so forth. On the other hand, a different policy may be to implement a loose classification policy such that the barcode comparator module classifies a majority of barcodes as "likely good" guesses. A consequence of implementing a loose classification policy may be that barcodes classified as "likely good" guesses may be false positives due to the low threshold set for "likely good" guesses. With these and other considerations in mind, the number of likely good digits threshold may be set at a level that minimizes false positives while still classifying a majority of barcodes as "likely good" guesses. In an example embodiment, the barcode comparator module 208 is able to verify the accuracy of decoding of 98% of the estimated barcodes while suffering from 1% to 2% false positives.

In an example embodiment, the test batch of barcodes used to set and adjust the number of likely good digits threshold value is included with the software code for the barcode reading application 202. In this example embodiment, including the test batch of barcodes with the software code enables the classification analysis to be performed by the client machine 108, thereby minimizing the time needed to perform the analysis and obviating the need to transmit estimated barcode data to a server over a network for analysis. In an example embodiment, the estimated barcode data, or a strip of the barcode (e.g., a horizontal cross-section of the barcode), may be transmitted to a server for analysis or another purpose, such as verifying whether the estimated barcode actually exists. Such verification may compare the estimated barcode to a universe of all existing barcodes. If the estimated barcode submitted to the server does not exist, the server may return a different barcode candidate obtained from the database of all existing barcodes to the client device.

Communication module 210 may transmit estimated barcode data, such as a horizontal strip or cross-section of estimated barcode data, to application server 122 via network 104 for analysis or verification and receive a classification or verification determination in return. Communication module 210 further may transmit decoded barcode data to application server via network and receive data from the commerce or publication system related to the barcode data. For example, barcode data may be transmitted to the network-based publisher 102 to receive product information related to the barcode. In another example embodiment, decoded barcode data may be submitted to retrieve price or product comparison data concerning the product identified by the barcode and similar products. In an example embodiment, barcode decoding itself is performed by the client 108 without any network communications in the interests of preserving efficiency and speed.

Figure 3:
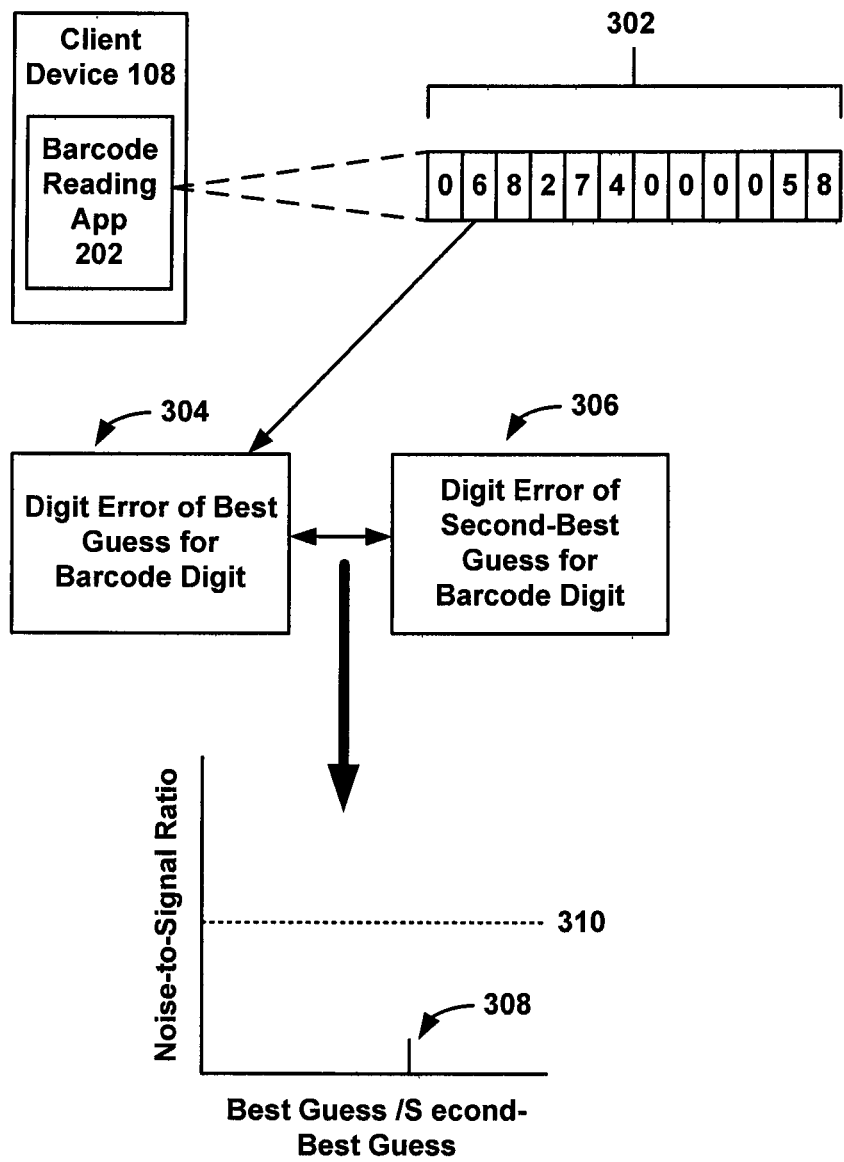
FIG. 3 is a diagram of an example embodiment of a classification of an estimated barcode.

FIG. 3 is a diagram of an example embodiment of the classification of an estimated barcode. Referring to FIG. 3, a client barcode reading application 202 executing on a client machine 108 is shown. Barcode reading application 202 may estimate the digits of a barcode during a decoding process. The barcode may be decoded from a stream of video frames. The estimated digits of a barcode, such as the example barcode 302 shown in FIG. 3, may be analyzed and classified as "likely good" or "likely bad" guesses on a digit-by-digit basis. For example, referring to FIGS. 2 and 3, barcode classifier module 206 may compare the noise-to-signal ratio of each estimated or best guess digit with a second-best guess digit to determine the likelihood that the best guess digit estimate is "likely good." In the example embodiment of FIG. 3, the best guess for the second digit of example barcode 302 is shown as being estimated to be a '6.' Barcode classifier module 206 may compare the digit error value of the estimated digit 304 with a second-best digit guess. In an example embodiment, the digit error value for the second-best digit guess 306 may be determined. The ratio of digit errors for the best guess to the second-best guess 308 is obtained. This ratio 308 may be compared to a noise-to-signal ratio threshold value 310. If the ratio of digit errors 308 is less than the noise-to-signal ratio threshold value 310, the best guess for the digit may be considered to be a "likely good" guess.

Alternatively, or in addition to the noise-to-signal ratio comparisons, barcode classifier module 206 may compare the noise-to-signal ratio of a best guess of the digit to a noisy answer threshold (not shown). The noisy answer threshold may represent a ceiling which a noise-to-signal ratio for an estimated digit should not surpass if the estimated digit is to be considered as more than noise.

Figure 4:
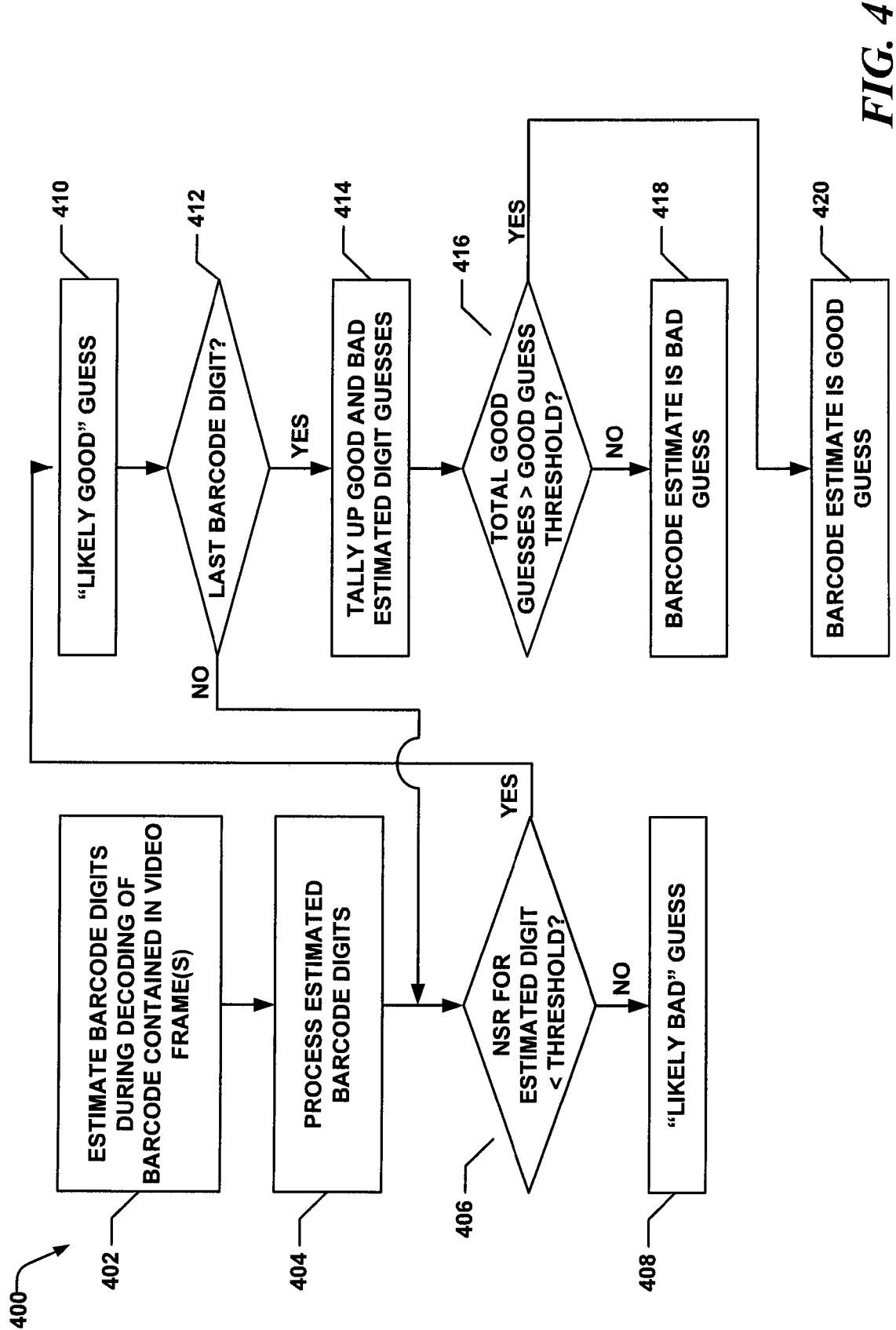
FIG. 4 is a flow chart of an example method for estimating and classifying a barcode.

FIG. 4 is a flow chart of an example method 400 for estimating and classifying a barcode. At operation 402, a stream of video frames may be received by a client device, and a barcode reading application executing on the client device may recognize and attempt to decode a barcode contained in the stream of video frames. The decoding of the barcode may entail estimating a best guess for each of the digits of the barcode from an image of the barcode contained in the video frames.

At operation 404, the best guess barcode digits obtained during decoding may be processed. In particular, for each barcode digit, a digit error may be calculated for the best and second-best guesses for the particular barcode digit. The digit error may be the summed pixel intensity difference between the actual input image (nearby the digit in question) and a synthetic representation of the best digit guess. A ratio of the digit error for the best barcode digit guess to the digit error for the second-best barcode digit guess may be calculated. The ratio may reflect a noise-to-signal ratio.

At operation 406, the ratio of the digit error for the best barcode digit guess to the digit error for the second-best barcode digit guess may be compared to a "likely good" digit threshold. At operation 408, if the ratio is greater than the "likely good" digit threshold, the best guess of the barcode digit is considered to be a "likely bad" guess. At operation 410, if the ratio is less than the "likely good" digit threshold, the best guess of the barcode digit is considered to be a "likely good" guess.

At operation 412, it may be determined if the processed estimated digit is the last digit of the barcode digit sequence. If not, the example method 400 may return to operation 406 to process the next estimated barcode digit. If the processed estimated digit is the last digit of the barcode digit sequence, the example method 400 may proceed to operation 414.

At operation 414, a barcode classifier module may count the number of "likely good" barcode digit guesses and the number of "likely bad" barcode digit guesses. At operation 416, the total number of "likely good" guesses is compared to a "number of likely good digits necessary for a likely correct final result" threshold. The "number of likely good digits necessary for a likely correct final result" threshold may have its value determined by the supervised machine-learning algorithm. The supervised machine-learning algorithm may process a test set of barcodes. Using the results obtained from decoding and estimating the barcodes in the test set, the supervised machine-learning algorithm may set a "number of likely good digits necessary for a likely correct final result" threshold signifying how many digits should be considered "likely good" guesses for the estimated barcode to be considered a "likely correct final result." At operation 418, if the number of "likely good" digit guesses is lower than the "number of likely good digits necessary for a likely correct final result" threshold, the barcode estimate as a whole is considered to be a "likely incorrect final result." As a result, the barcode reading application may have to attempt to decode the barcode again. At operation 420, if the number of "likely good" digit guesses is greater than the "number of likely good digits necessary for a likely correct final result" threshold, the barcode estimate as a whole is considered a "likely correct final result."

Figure 5:
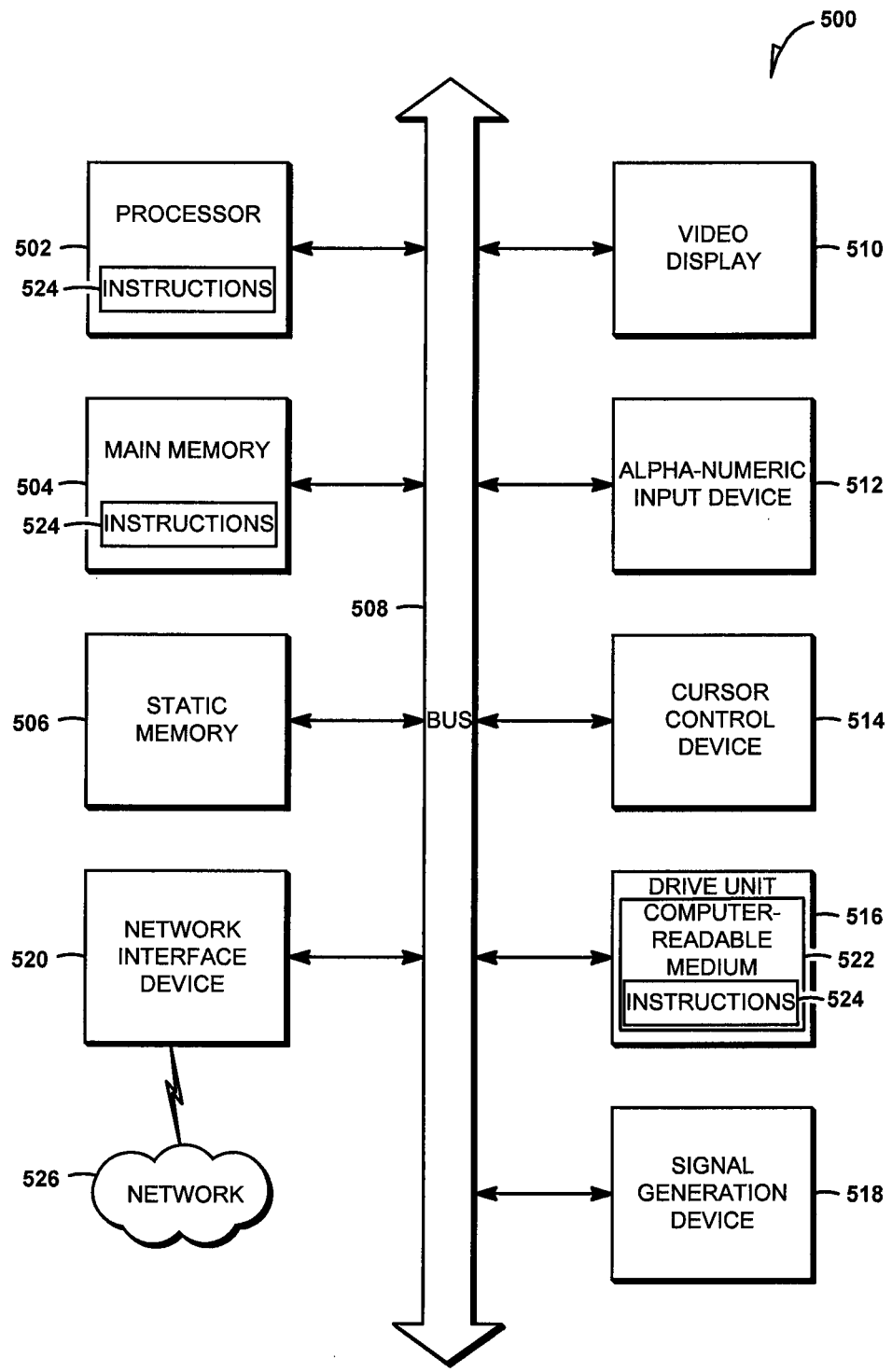
FIG. 5 shows a diagrammatic representation of a machine in the example form of a computer system within which a set of instructions may be executed to cause the machine to perform any one or more of the methodologies discussed herein.

FIG. 5 shows a diagrammatic representation of machine in the example form of a computer system 500 within which a set of instructions may be executed causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a PC, a tablet PC, a STB, a PDA, a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 500 includes a processor 502 (e.g., a central processing unit (CPU), a graphics processing unit (GPU) or both), a main memory 504 and a static memory 506, which communicate with each other via a bus 508. The computer system 500 may further include a video display unit 510 (e.g., a liquid crystal display (LCD) or a cathode ray tube (CRT)). The computer system 500 also includes an alphanumeric input device 512 (e.g., a keyboard), a user interface (UI) navigation device 514 (e.g., a mouse), a disk drive unit 516, a signal generation device 518 (e.g., a speaker) and a network interface device 520.

The disk drive unit 516 includes a machine-readable medium 522 on which is stored one or more sets of instructions and data structures (e.g., software 524) embodying or utilized by any one or more of the methodologies or functions described herein. The software 524 may also reside, completely or at least partially, within the main memory 504 and/or within the processor 502 during execution thereof by the computer system 500, with the main memory 504 and the processor 502 also constituting machine-readable media.

The software 524 may further be transmitted or received over a network 526 via the network interface device 520 utilizing any one of a number of well-known transfer protocols (e.g., Hypertext Transfer Protocol).

While the machine-readable medium 522 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies disclosed herein, or that is capable of storing, encoding or carrying data structures utilized by or associated with such a set of instructions. The term "machine-readable medium" shall accordingly be taken to include, but not be limited to, solid-state memories, optical media, and magnetic media.

Certain embodiments are described herein as including logic or a number of components, modules, or mechanisms. A component or a module is a non-transitory and tangible unit capable of performing certain operations and may be configured or arranged in a certain manner. In example embodiments, one or more computer systems (e.g., a standalone, client or server computer system) or one or more components of a computer system (e.g., a processor or a group of processors) may be configured by software (e.g., an application or application portion) as a component that operates to perform certain operations as described herein.

In various embodiments, a component or a module may be implemented mechanically or electronically. For example, a component or a module may comprise dedicated circuitry or logic that is permanently configured (e.g., as a special-purpose processor) to perform certain operations. A component or a module also may comprise programmable logic or circuitry (e.g., as encompassed within a general-purpose processor or other programmable processor) that is temporarily configured by software to perform certain operations. It will be appreciated that the decision to implement a component or a module mechanically, in dedicated and permanently configured circuitry, or in temporarily configured circuitry (e.g., configured by software) may be driven by cost and time considerations.

Accordingly, the term "component" or "module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which components or modules are temporarily configured (e.g., programmed), each of the components or modules need not be configured or instantiated at any one instance in time. For example, where the components or modules comprise a general-purpose processor configured using software, the general-purpose processor may be configured as respective different components or modules at different times. Software may accordingly configure a processor, for example, to constitute a particular component or module at one instance of time and to constitute a different component or module at a different instance of time.

Components or modules can provide information to, and receive information from, other components or modules. Accordingly, the described components or modules may be regarded as being communicatively coupled. Where multiple of such components or modules exist contemporaneously, communications may be achieved through signal transmission (e.g., over appropriate circuits and buses) that connect the components or modules. In embodiments in which multiple components or modules are configured or instantiated at different times, communications between such components or modules may be achieved, for example, through the storage and retrieval of information in memory structures to which the multiple components or modules have access. For example, one component or module may perform an operation, and store the output of that operation in a memory device to which it is communicatively coupled. A further component or module may then, at a later time, access the memory device to retrieve and process the stored output. Components or module may also initiate communications with input or output devices, and can operate on a resource (e.g., a collection of information).

Although an embodiment has been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The preceding technical disclosure is intended to be illustrative, and not restrictive. For example, the above-described embodiments (or one or more aspects thereof) may be used in combination with each other. Other embodiments will be apparent to those of skill in the art upon reviewing the above description. The scope of the claims should, therefore, be determined with reference to the appended claims, along with the full scope of equivalents to which such claims are entitled. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," "third," and so forth are used merely as labels and are not intended to impose numerical requirements on their objects.

In this document, the terms "a" or "an" are used, as is common in patent documents, to include one or more than one. In this document, the term "or" is used to refer to a nonexclusive or, such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A system, comprising:
a processor-implemented barcode classifier module configured to:
generate a classification determination for each of a plurality of estimated barcode digits corresponding to an estimated decoded barcode, the classification determination being one of a first classification determination and a second classification determination, and the classification determination being generated by calculating a noise-to-signal ratio of a best barcode digit estimate to a second-best barcode digit estimate and comparing the noise-to-signal ratio to a first predetermined threshold value; and
aggregate first classification determinations among a plurality of classification determinations for the plurality of estimated barcode digits; and
a processor-implemented barcode comparator module configured to compare the aggregated first classification determinations with a second predetermined threshold to determine a validity of the decoded barcode estimation.

2. The system of claim 1, wherein the classification determination is the first classification determination based on the noise-to-signal ratio being lower than the first predetermined threshold value, and wherein the classification determination is the second classification determination based on the noise-to-signal ratio being not lower than the first predetermined threshold value.

3. The system of claim 1, wherein the first classification determination indicates that the estimated barcode digit is likely accurate, and wherein the second classification determination indicates that the estimated barcode digit is likely inaccurate.

4. The system of claim 1, wherein the decoded barcode estimation is determined to be likely correct based on the aggregated first classification determinations being greater than the second predetermined threshold, and wherein the decoded barcode estimation is determined to be likely incorrect based on the aggregated first classification determinations being not greater than the second predetermined threshold.

5. The system of claim 1, further comprising a processor-implemented communication module configured to transmit a portion of the decoded barcode estimation to a server via a network and receive confirmation of an existence of a barcode corresponding to the decoded barcode estimation.

6. The system of claim 1, wherein the second predetermined threshold is generated from a set of decoded barcodes.

7. The system of claim 1, further comprising a processor-implemented barcode decoder module configured to generate the decoded barcode estimation from a stream of video frames.

8. A computer-implemented method, comprising:
generating a classification determination for each of a plurality of estimated barcode digits corresponding to a decoded barcode estimation, the classification determination being one of a first classification determination and a second classification determination, and the classification determination being generated by calculating a noise-to-signal ratio of a best barcode digit estimate to a second-best barcode digit estimate and comparing the noise-to-signal ratio to a first predetermined threshold value;
aggregating first classification determinations among a plurality of classification determinations for the plurality of estimated barcode digits; and
comparing the aggregated first classification determinations with a second predetermined threshold to determine a validity of the decoded barcode estimation.

9. The computer-implemented method of claim 8, wherein the classification determination is the first classification determination based on the noise-to-signal ratio being lower than the first predetermined threshold value, and wherein the classification determination is the second classification determination based on the noise-to-signal ratio being not lower than the first predetermined threshold value.

10. The computer-implemented method of claim 8, wherein the first classification determination indicates that the estimated barcode digit is likely accurate, and wherein the second classification determination indicates that the estimated barcode digit is likely inaccurate.

11. The computer-implemented method of claim 8, wherein the decoded barcode estimation is likely correct based on the aggregated first classification determinations being greater than the second predetermined threshold, and wherein the decoded barcode estimation is likely incorrect based on the aggregated first classification determinations being not greater than the second predetermined threshold.

12. The computer-implemented method of claim 8, further comprising:
transmitting a portion of the decoded barcode estimation to a server via a network; and
receiving confirmation of an existence of a barcode corresponding to the decoded barcode estimation.

13. The computer-implemented method of claim 8, wherein the second predetermined threshold is generated from a set of decoded barcodes.

14. A non-transitory machine-readable storage medium storing a set of instructions that, when executed by a machine, causes the machine to perform operations, comprising:
generating a classification determination for each of a plurality of estimated barcode digits corresponding to a decoded barcode estimation, the classification determination being one of a first classification determination and a second classification determination and the classification determination being generated by calculating a noise-to-signal ratio of a best barcode digit estimate to a second-best barcode digit estimate and comparing the noise-to-signal ratio to a first predetermined threshold value;
aggregating first classification determinations among a plurality of classification determinations for the plurality of estimated barcode digits; and
comparing the aggregated first classification determinations with a second predetermined threshold to determine a validity of the decoded barcode estimation.

15. The non-transitory machine-readable storage medium of claim 14, wherein the classification determination is the first classification determination based on the noise-to-signal ratio being lower than the first predetermined threshold value, and wherein the classification determination is the second classification determination based on the noise-to-signal ratio being not lower than the first predetermined threshold value.

16. The non-transitory machine-readable storage medium of claim 14, wherein the first classification determination indicates that the estimated barcode digit is likely accurate, and wherein the second classification determination indicates that the estimated barcode digit is likely inaccurate.

17. The non-transitory machine-readable storage medium of claim 14, wherein the decoded barcode estimation is likely correct based on the aggregated first classification determinations being greater than the second predetermined threshold, and wherein the decoded barcode estimation is likely incorrect based on the aggregated first classification determinations being not greater than the second predetermined threshold.

18. The non-transitory machine-readable storage medium of claim 14, further comprising:
transmitting a portion of the decoded barcode estimation to a server via a network; and
receiving confirmation of an existence of a barcode corresponding to the decoded barcode estimation.

19. The non-transitory machine-readable storage medium of claim 14, wherein the second predetermined threshold is generated from a set of decoded barcodes.

* * * * *

UNITED STATES PATENT AND TRADEMARK OFFICE
CERTIFICATE OF CORRECTION

| | | |
|---|---|---|
| PATENT NO. | : 8,851,382 B2 | Page 1 of 1 |
| APPLICATION NO. | : 12/885221 | |
| DATED | : October 7, 2014 | |
| INVENTOR(S) | : Powers et al. | |

It is certified that error appears in the above-identified patent and that said Letters Patent is hereby corrected as shown below:

In the Claims

Column 4, line 8, Claim 14, after "determination", insert --,--, therefor

Signed and Sealed this
Tenth Day of February, 2015

Michelle K. Lee
*Deputy Director of the United States Patent and Trademark Office*